United States Patent [19]

Yokoyama et al.

[11] Patent Number: 5,670,765
[45] Date of Patent: Sep. 23, 1997

[54] AUTOMOTIVE LEVER SWITCH

[75] Inventors: Toshiaki Yokoyama; Takeshi Shibata, both of Tokyo, Japan

[73] Assignee: Niles Parts Co., Ltd., Japan

[21] Appl. No.: 614,644

[22] Filed: Mar. 13, 1996

[30] Foreign Application Priority Data

Apr. 28, 1995 [JP] Japan ................... 7-129006

[51] Int. Cl.$^6$ ................................................. H01H 9/00
[52] U.S. Cl. ............................................... 200/61.54
[58] Field of Search .......................... 200/61.54, 61.27, 200/61.38, 4

[56] References Cited

U.S. PATENT DOCUMENTS

| | | | |
|---|---|---|---|
| 3,499,125 | 3/1970 | Stoi | 200/4 |
| 3,511,943 | 5/1970 | Kibler | 200/4 |
| 3,671,691 | 6/1972 | Suzuki | 200/61.54 |
| 4,387,279 | 6/1983 | Brevick | 200/61.54 |
| 4,387,954 | 6/1983 | Iwata et al. | 200/4 |
| 5,003,132 | 3/1991 | Lagier | 200/4 |
| 5,107,243 | 4/1992 | Maeda | 200/61.54 X |

FOREIGN PATENT DOCUMENTS 5-21797  6/1993  Japan ................... H01H 25/04

*Primary Examiner*—J. R. Scott
*Attorney, Agent, or Firm*—Ronald P. Kananen

[57] ABSTRACT

An automotive lever switch 1 includes a tubular bearing 1a. A switch plate 2 is inserted within an opening 1i of the lever 1 and includes a fixed contact plate 15. An intermediate knob 5 includes a movable contact plate 3 placed in contact with the fixed contact plate 15. A fixed knob 8 is fixedly mounted to the tubular bearing 1a of the lever 1. A shaft 13 is inserted into the tubular bearing 1a. An arm 14 is secured to one end of the shaft 13, and a rotating knob 9 is secured to the other end of the shaft 13. The rotating knob 9 includes a resilient arm 9b engaged with a locking recess 13a of the shaft 13. This arrangement allows for mounting of the rotating knob to the shaft in a single fabrication step.

3 Claims, 4 Drawing Sheets

AUTOMOTIVE LEVER SWITCH

BACKGROUND OF THE INVENTION

1. Field of the Invention

The present invention relates to switching devices and, in particular, to an automotive lever switch wherein a turn signal or other switches are mounted to the distal end of a lever.

2. Description of the Prior Art

A conventional automotive lever switch is disclosed, for example, in Japanese utility model publication No. Hei 5-21797. The lever switch includes a lever and two rotating knobs mounted to the distal end of the lever. An end knob is fixed to a shaft by a pin.

This conventional lever switch requires a pin to mount the end knob to the shaft. This arrangement makes assembly of the lever switch cumbersome and increases the number of required parts and fabrication steps.

SUMMARY OF THE INVENTION

The present invention solves the problems in the above-mentioned prior art. To overcome the problems associated with the prior art, the present invention provides an automotive lever switch that comprises a lever including a tubular bearing, a switch plate inserted within an opening of the lever and including a fixed contact plate, an intermediate knob including a movable contact plate placed in contact with the fixed contact plate, a fixed knob secured to the tubular bearing, a shaft inserted into the tubular bearing, an arm secured to one end of the shaft, and a rotating knob secured to the other end of the shaft. The rotating knob includes a resilient arm that is engaged with a locking recess of the shaft.

Also, according to the present invention, the rotating knob includes an axial bore adapted to receive the shaft and having an open end in which the resilient arm extends. The rotating knob has an annular recess located outwardly of the resilient arm and adapted to receive the cylindrical portion of a cap.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

Figure 1:
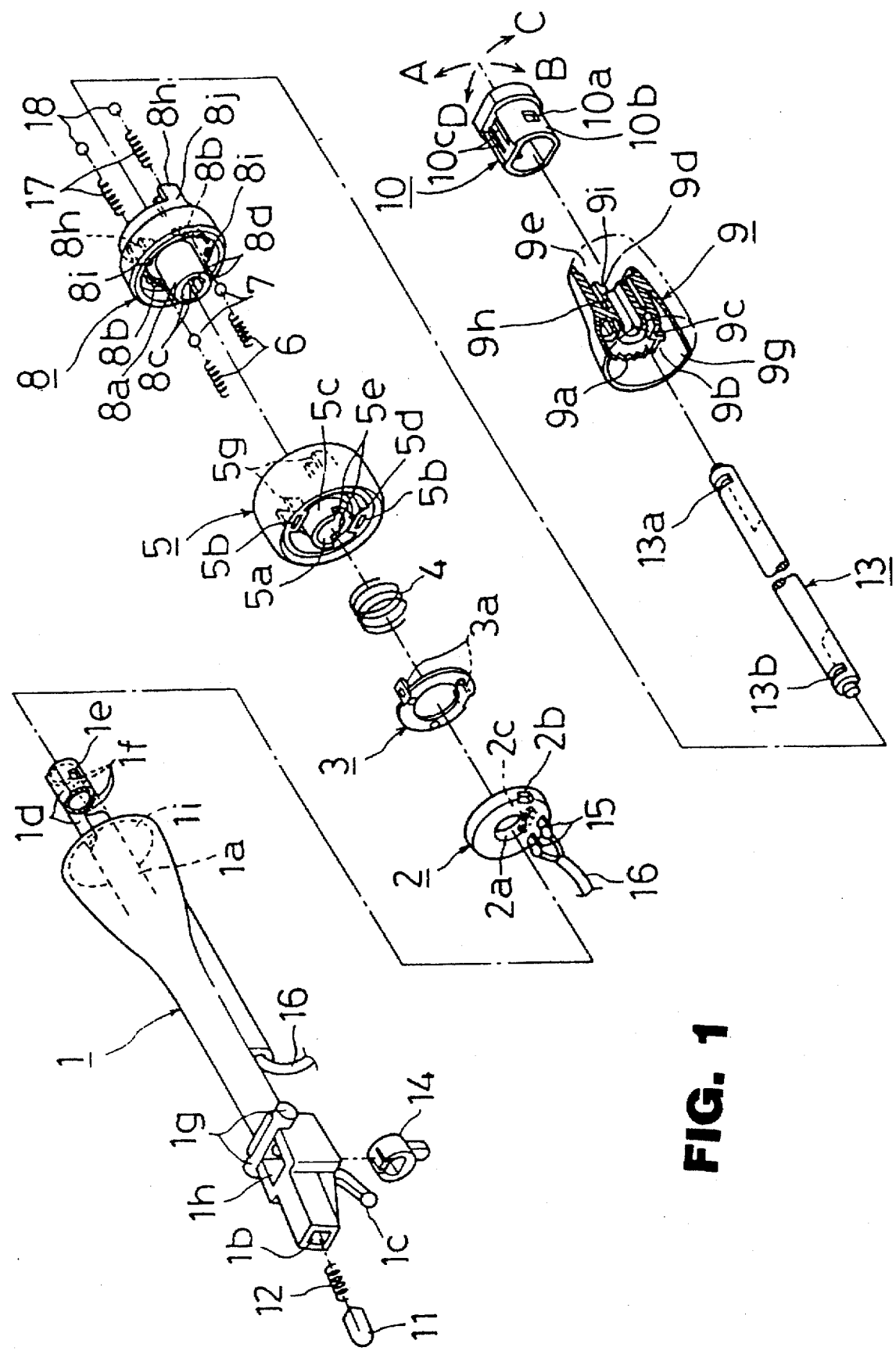
FIG. 1 is a exploded perspective view of an automotive lever switch according to a preferred embodiment of the present invention.

A preferred embodiment of the present invention will now be described in detail with reference to FIGS. 1 to 4.

A lever 1 serves as an operating member for a turn signal switch, a dimming switch or other automotive switches. In the following description, the lever 1 according to one embodiment of the present invention serves as an operating member for a turn signal and dimming switch. It will be understood that the lever 1 may be used as an operating member for a wiper switch.

The lever 1 is provided at its one end with a tubular bearing 1a. A shaft 13 is rotatably supported within the tubular bearing 1a. A switch plate 2, a movable contact plate 3, a contact spring 4, an intermediate knob 5, a pair of click springs 6, a pair of click elements 7, a fixed knob 8, a rotating knob 9, and a cap 10 are all mounted to the tubular bearing 1a of the lever 1. The lever 1 is formed at its other end with a blind hole 1b that is adapted to receive a click pin 11 and a coil spring 12.

The tubular bearing 1a extends centrally out of a bell-mouthed opening 1i. The tubular bearing 1a has a cutout at its upper surface, holes 1e at its opposite sides, and locking grooves at its lower surface. The tubular bearing 1a includes a pin 1g, an operating rod 1c and a through hole 1h adjacent to the blind hole 1b.

The operating rod 1c is engaged with the movable plate (not shown) of a main/dimming switch and adapted to transmit movement of the lever 1 to the movable plate. The pin 1g is mounted to the movable plate (not shown) of a turn signal switch. The lever 1 is rotated about the pin 1g in directions indicated by the arrows A and B. The lever 1 is also rotated about the pin of the movable plate of the turn signal switch in directions indicated by the arrows C and D. The through hole 1h provides space to contain an arm 14 that is engaged with the movable plate (not shown) of a headlight switch.

The switch plate 2 is a substantially doughnut-shaped member and includes an opening 2a through which the tubular bearing 1a extends. A fixed contact plate 15 is crimped or secured to the front surface of the switch plate 2. At the rear surface of the switch plate 2, a cord 16 is soldered to the fixed contact plate 15. The fixed contact plate 15 may be integrally formed with the switch plate 2 by an insert molding.

A locking notch 2b is formed in the circumference of the switch plate 2. A projection (not shown) extends from the inner wall of the opening 1i of the lever 1. The locking notch 2b is engaged with the projection to lock the switch plate 2 against rotation. When the switch plate 2 is inserted within the opening 1i of the lever 1, the rear surface of the switch plate 2 is brought into engagement with a seat (not shown) that is formed in the inner wall of the lever 1.

The movable contact plate 3 is engaged with the intermediate knob 5 through the contact spring 4. A pair of apertured lugs 3a extend from the outer periphery of the movable contact plate 3. Upon mounting of the movable contact plate 3 to the intermediate knob 5, the lugs 3a are inserted into a corresponding pair of through openings 5b of the intermediate knob 5 with the apertures of the lugs 3a being engaged with pawls (not shown) formed within the through openings 5b. The contact spring 4 is loosely fit around a cylindrical portion 5c and also sandwiched between the movable contact plate 3 and the intermediate knob 5.

Figure 3:
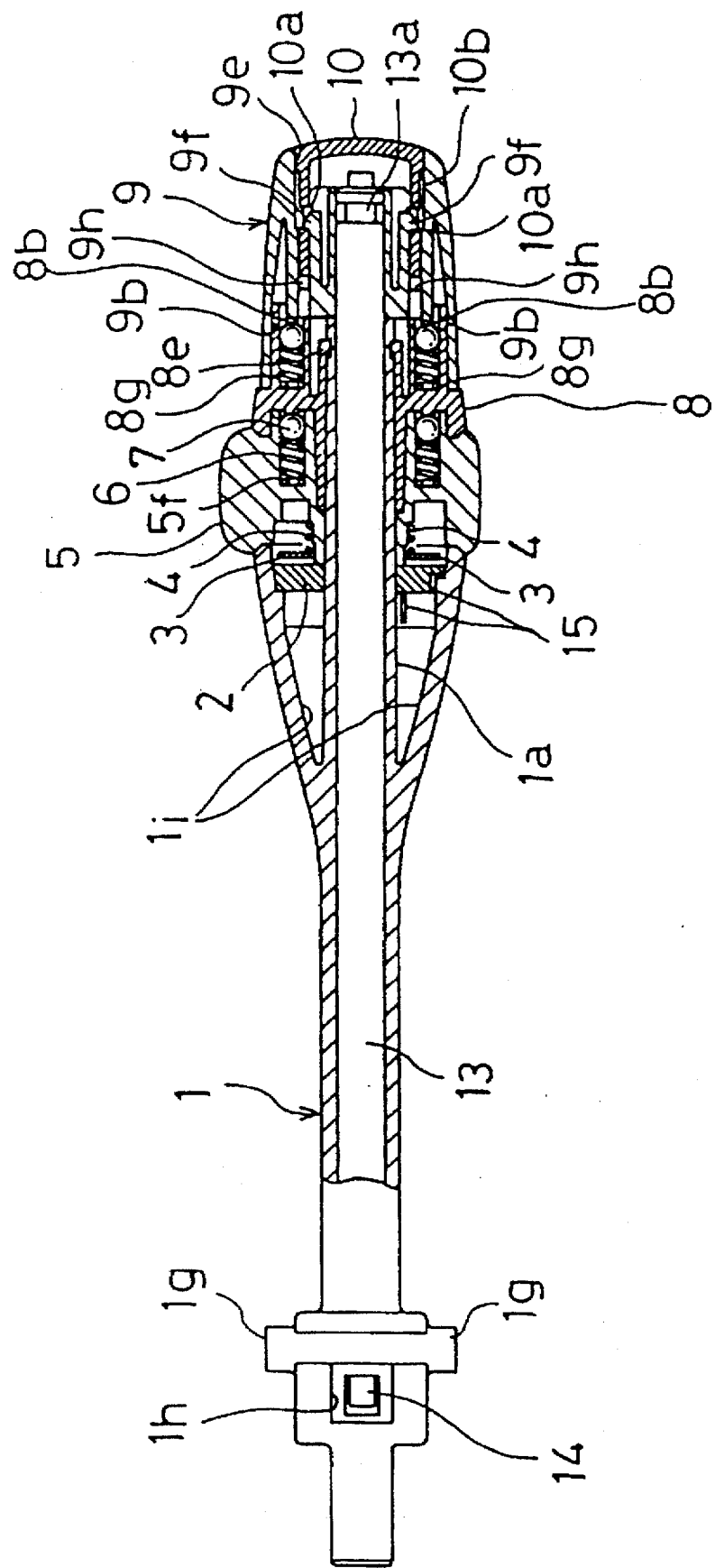
FIG. 3 is a horizontal sectional view, on an enlarged scale, of the automotive lever switch according to the preferred embodiment of the present invention.

The intermediate knob 5 acts as a fog lamp switch to turn on a fog lamp. The intermediate knob 5 has a substantially doughnut shape and includes a bore 5a. The fixed knob 8 has a cylindrical portion 8a inserted into the bore 5a. As shown in FIG. 3, a pair of blind holes 5f are formed in the front surface of the intermediate knob 5 to receive a pair of click springs 6 and a corresponding pair of click elements 7. An annular groove (not shown) is formed around and located at opposite sides of the blind holes 5f. A projection includes click recesses 8b and is rotatably mounted within the annular groove.

The cylindrical portion 5c has a notch 5d. The switch plate 2 has an alignment projection 2c. The alignment projection 2c is loosely engaged with the notch 5d to insure that the intermediate knob 5 is mounted to the lever 1 at a given location. When the intermediate knob 5 is rotated, restrictive members 5g, which extend toward the fixed knob 8, are brought into contact with stoppers 8i so as to limit the extent of rotation of the intermediate knob 5. The intermediate knob 5 may act as a rear wiper switch or a wiper volume switch.

The fixed knob 8 includes locking projections 8c and a pair of projections 8d. The locking projections 8c extend inwardly from the rear open end of the cylindrical portion 8a and are pressed against the cutout 1d of the tubular bearing 1a. The projections 8d are received within the locking grooves 1f. Two resilient elements 8e extend inwardly from the front open end of the cylindrical portion 8a. When the fixed knob 8 is fit around the tubular bearing 1a, the resilient elements 8e are engaged with the holes 1e to secure the fixed knob 8 to the tubular bearing 1a.

Figure 2:
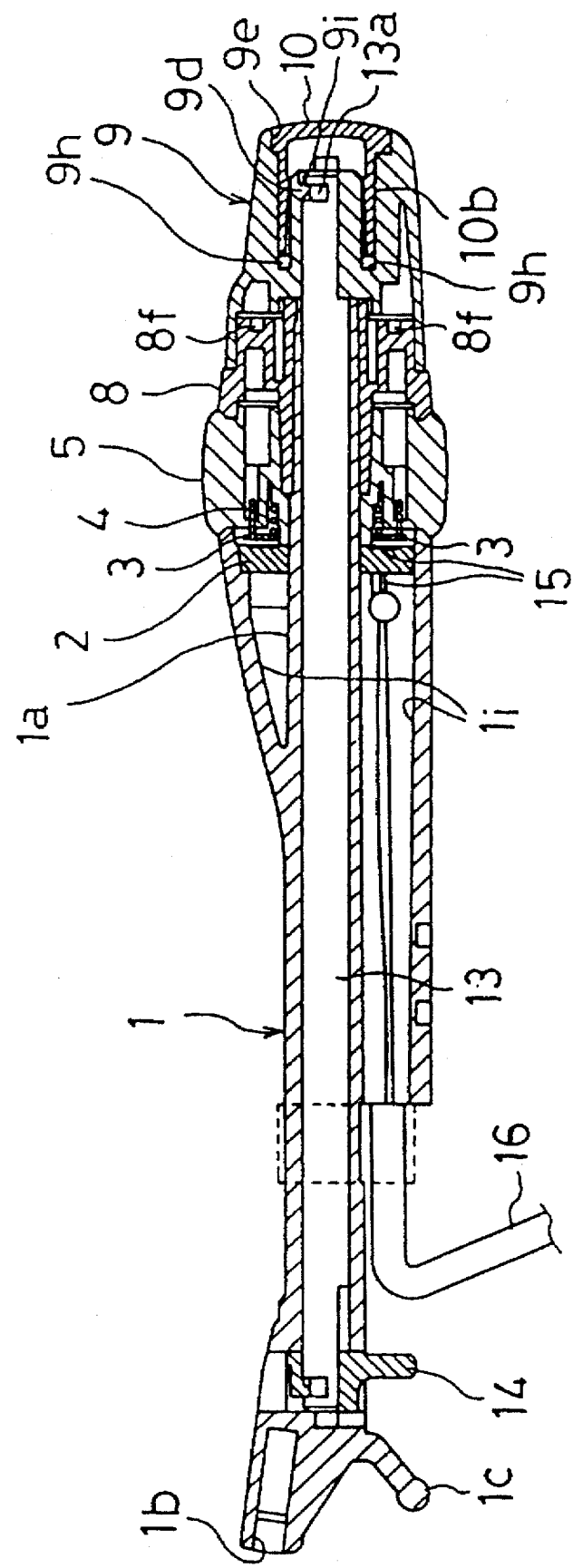
FIG. 2 is a vertical sectional view, on an enlarged scale, of the automotive lever switch according to the preferred embodiment of the present invention.
Figure 4:
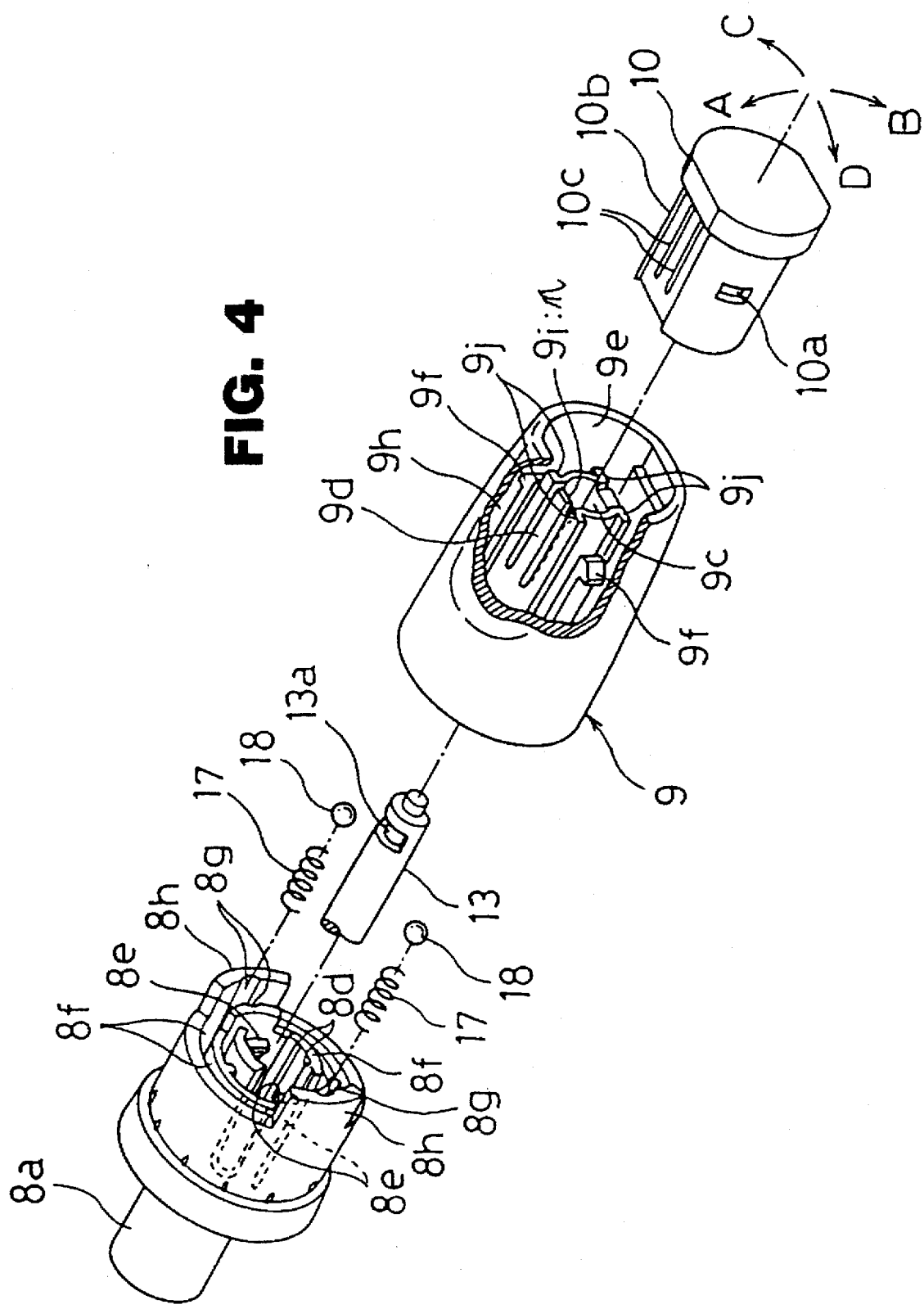
FIG. 4 is an enlarged perspective view of the principal part of the preferred embodiment of the present invention, showing the manner in which a rotating knob is mounted.

As shown in FIG. 2, an annular groove 8f is formed in the front surface of the fixed knob 8. A pair of arcuate projections are formed in the rear surface of the rotating knob 9 and each include click recesses 9a. As shown in FIG. 4, counterbores 8g are also formed in the annular groove 8f to receive click springs 17 and click elements 18. As shown in FIGS. 1 and 4, a pair of projections 8h are provided outside of the counterbores 8g and fit within restrictive recesses 9b.

The rotating knob 9 serves as an operating member for a headlight switch or a wiper volume switch. The rotating knob 9 has an axial bore 9c. A resilient arm 9d with a pawl 9i and guide projections 9j are provided at one open end of the axial bore adjacent to the cap 10. The axial bore 9c is semicircular in shape. When the shaft 13 is inserted into the axial bore 9c, the pawl 9i of the resilient arm 9d is brought into engagement with the locking recess 13a to secure the rotating knob 9 to the distal end of the shaft 13. The rotating knob 9 is thus rotated with the shaft 13 and the arm 14. The cap 10 has a cylindrical portion 10b in which a pair of holes 10a are formed. When the cap 10 is inserted into the front open end 9e of the rotating knob 9, a pair of resilient pawls 9f are brought into engagement with the holes 10a to secure the rotating knob 9 to the cap 10.

As shown in FIG. 1, the restrictive recesses 9b are arcuate in shape and formed outside of the projections that are formed with the click recesses 9a. The projections 8h are loosely fit within the restrictive recesses 9b. As shown in FIGS. 1, 2 and 4, the resilient arm 9d includes the pawl 9i engaged with the locking recess 13a of the shaft 13 and forms part of the inner wall of the axial bore 9c. As shown in FIGS. 3 and 4, the resilient pawls 9f are contiguously located at opposite sides of the axial bore 9c. An annular recess 9h is formed around the resilient arm 9d, the resilient pawls 9f and the guide projections 9j and is engaged with the cylindrical portion 10b of the cap 10. The four guide projections 9j extend laterally from the open end of the axial bore 9c and are engaged with four corners of the inner wall of the cylindrical portion 10b.

The cap 10 is a cover with the cylindrical portion 10b fit into the open end 9e of the rotating knob 9. The cylindrical portion 10b has a flat top and bottom. A pair of ridges 10c are formed on the flat surfaces of the cylindrical portion 10b.

The ridges 10c are in the form of two small, elongated projections. When the cap 10 is fit into the open end 9e, the ridges 10c are pressed into contact with the inner wall of the rotating knob 9.

The shaft 13 is rotatably supported within the tubular bearing 1a and is in the form of a rod. The arm is fit around one end of the shaft 13, and the rotating knob 9 is fit around the other end of the shaft 13. The shaft 13 has semicylindrical opposite ends onto which the arm 14 and the rotating knob 9 are fit. The shaft 13 also includes locking recesses 13a and 13b that are engaged with the resilient arm 9d and other elements.

The arm 14 is located within the through hole 1h and fit around one end of the shaft 13. The arm 14 is pivoted about the axis of the shaft 13 so as to swing the movable plate (not shown) of the headlight switch in rightward and leftward directions to switch contacts. The cord 16 has one end soldered to the fixed contact plate 15 of the switch plate 2. The cord 16 is inserted into the lever 1 and extends out of the lever 1 adjacent to the pin 1g.

Operation and assembly of the lever switch thus constructed will next be described with reference to the accompanying drawings.

One end of the cord 16 is soldered to the fixed contact plate 15 that is integrally formed with the switch plate 2 by an insert molding. The other end of the cord 16 extends out of the lever 1 after the cord 16 has passed therethrough. The tubular bearing 1a is then caused to pass through the opening 2a of the switch plate 2. The switch plate 2 is inserted within the opening 1i of the lever 1 with the locking notch 2b being engaged with the projection within the opening 1i. Rotation of the switch plate 2 is stopped when the locking notch 2b is brought into engagement with the projection within the opening 1i.

The movable contact plate 3 is secured to the intermediate knob 5 with the contact spring 4 disposed therebetween. While the tubular bearing 1a extends through the bore 5a of the intermediate knob 5, the alignment projection 2c of the switch plate 2 is loosely engaged with the notch 5d. This allows the intermediate knob 5 to be mounted to a given location within the opening 1i.

The click springs 6 and the click elements 7 are inserted into the blind bores 5f of the intermediate knob 5. The cylindrical portion 8a of the fixed knob 8 is fit over the tubular bearing 1a and also, inserted into the bore 5a of the intermediate knob 5. At this time, the restrictive members 5g are positioned between the respective stoppers 8i. The click elements 7 are pressed into contact with the click recesses 8b to allow the intermediate knob 5 to enjoy click movement during rotation. The projection is fit within the annular groove 8f while the front end of the click recesses 8b are pressed into contact with the click elements 7.

The locking projections 8c are pressed into contact with the cutout 1d of the tubular bearing 1a to eliminate a play and lock the fixed knob 8 against rotation. The projections 8d are also fit within the locking grooves 1f of the tubular bearing 1a to prevent rotation of the fixed knob 8. As shown in FIG. 3, the resilient elements 8e are engaged with the holes 1e of the tubular bearing 1a to prevent the fixed knob 8 from being disengaged from the tubular bearing 1a. In this way, the fixed knob 8 is fixedly mounted to the tubular bearing 1a of the lever 1.

Now that the fixed knob 8 is fixed to the tubular bearing 1a, the intermediate knob 5 cannot be moved in the axial direction of the tubular bearing 1a. The restrictive members 5g of the intermediate knob 5 are positioned between the respective stoppers 8*i*. When the intermediate knob 5 is rotated, the restrictive members 5*g* are brought into contact with the stoppers 8*i*. This contact limits the extent of the rotation of the intermediate knob 5.

The arm 14 is inserted into the through hole 1*h*. After the shaft 13 is inserted through the tubular bearing 1*a*, the arm 14 is fixedly mounted to one end of the shaft 13. The click springs 17 and the click elements 18 are inserted into the blind holes 8*g* of the fixed knob 8. The other end of the shaft 13 is inserted into the axial bore 9*c* of the rotating knob 9. The reduced portion 8*j* of the fixed knob 8 is fit into an opening 9*g*. The resilient arm 9*d* is engaged with the locking recess 13*a*. In this way, the rotating knob 9 is fixedly mounted to the shaft 13. The rotating knob 9 is rotated with the shaft 13 and the arm 14 with the guidance of the shaft 13 and the reduced portion 8*j*.

The reduced portion 8*j* of the fixed knob 8 is fit into the opening 9*g*. The projections 8*h* of the fixed knob 8 are loosely fit in the arcuate restrictive recesses 9*b*. When the rotating knob 9 is rotated, the projections 8*h* are brought into contact with the inner wall of the restrictive recesses 9*b* to limit the extent of rotation of the rotating knob 9. The click elements 18 are pressed against the click recesses 9*a*. As such, the rotating knob 9 is rotated with a click. The projection with the click recesses 9*a* are disposed within the counterbores 8*g*.

The open end 9*e* of the rotating knob 9 is closed by the cap 10. The resilient pawls 9*f* are engaged with the cylindrical portion 10*a* so as to secure the cap 10 to the rotating knob 9. The cylindrical portion 10*b* of the cap 10 is inserted into the annular recess 9*h* so as to prevent the resilient arm 9*d* from being bent outwards. Thus, the pawl 9*i* of the resilient arm 9*d* is in no way disengaged from the locking recess 13*a*. That is, no separation of the rotating knob 9 from the shaft 13 occurs after the cap 10 is fit into the rotating knob 9.

The lever 1 is pivotably mounted to the movable plate of the turn signal switch after the click pin 11 and the coil spring 12 are inserted into the blind hole 1*b*.

This completes assembly of the lever switch. With the automotive lever switch of the present invention, the switch plate 2, the movable contact plate 3, the contact spring 4, the intermediate knob 5, the click spring 6, the click elements 7, the fixed knob 8, the click springs 17, the click elements 18, the shaft 13, the rotating knob 9 and the cap 10 are all inserted in the axial direction of the tubular bearing 1*a*. This facilitates assembly of the lever switch and also, allows for automatic assembly and mass production of the lever switch.

The rotating knob 9 is mounted to the distal end of the lever 1. When the shaft 13 is inserted into the axial bore 9*c*, the resilient arm 9*d* comes into engagement with the locking recess 13*a*. This engagement allows for mounting of the rotating knob 9 to the shaft 1 in one fabrication step. This brings about a reduction in the number of fabrication steps and parts.

When the rotating knob 9 is rotated, the shaft 13 and the reduced portion 8*j* fit into the opening 9*g* to guide the rotating knob 9 while the rotating knob 9 is rotated with the shaft 13 and the arm 14 so as to turn on the headlight switch.

When the intermediate knob 5 is rotated about the tubular bearing 1*a*, the movable contact plate 3 is brought into contact with the fixed contact plate 15 to turn on the fog lamp switch.

As thus far described, the present invention offers the following advantages.

The present invention provides an automotive lever switch that comprises a lever including a tubular bearing, a switch plate inserted within an opening of the lever and including a fixed contact plate, an intermediate knob including a movable contact plate placed in contact with the fixed contact plate, a fixed knob secured to the tubular bearing, a shaft inserted into the tubular bearing, an arm secured to one end of the shaft, and a rotating knob secured to the other end of the shaft, wherein the rotating knob includes a resilient arm engaged with a locking recess of the shaft. This arrangement allows for mounting of the rotating knob to the shaft in one fabrication step, reduces the number of required parts and machining processes, and enables automatic assembly.

According to the present invention, the rotating knob includes an axial bore adapted to receive the shaft and having an open end at which the resilient arm is formed. The rotating knob further includes an annular recess located outwardly of the resilient arm and adapted to receive the cylindrical portion of a cap. This arrangement prevents outward bending of the resilient arm that may cause separation of the resilient arm from the locking recess, and also ensures securement of the rotating knob to the shaft.

It will be appreciated that the present invention is not limited to the exact construction that has been described above and which is illustrated in the accompanying drawings, and that various modifications and changes can be made without departing from the scope thereof. It is intended that the scope of the invention only be limited by the appended claims.

We claim:

1. An automotive lever switch, comprising:
   a lever (1) including a tubular bearing (1*a*);
   a switch plate (2) inserted within an opening (1*i*) of said lever (1) and including a fixed contact plate (15);
   an intermediate knob (5) including a movable contact plate (3) placed in contact with said fixed contact plate (15);
   a fixed knob (8) secured to said tubular bearing (1*a*); and
   a shaft (13) inserted into said tubular bearing (1*a*), an arm (14) secured to one end of said shaft (13), and a rotating knob (9) secured to the other end of said shaft (13), said rotating knob (9) including a resilient arm (9*d*) integral with said rotating knob (9) that is engaged with a locking recess (13*a*) of said shaft (13).

2. An automotive lever switch as defined in claim 1, wherein said rotating knob (9) includes an axial bore (9*c*) adapted to receive said shaft (13) and having an open end in which said resilient arm (9*d*) extends, said rotating knob (9) including an annular recess (9*h*) located outwardly of said resilient arm (9*d*) and adapted to receive a cylindrical portion (10*b*) of a cap (10).

3. An automotive lever switch as defined in claim 1, further comprising a cap (10) having a cylindrical portion (10*b*), said rotating knob (9) including an annular recess (9*h*) that surrounds said resilient arm (9*d*) and opens axially outwardly, and said cylindrical portion (10*b*) of said cap (10) is inserted axially into said annular recess (9*h*) whereby said cylindrical portion (10*b*) prevents movement of said resilient arm (9*d*) out of engagement with said locking recess (13*a*).

\* \* \* \* \*